US012391091B2

(12) United States Patent
Bielicki et al.

(10) Patent No.: US 12,391,091 B2
(45) Date of Patent: Aug. 19, 2025

(54) VEHICLE HVAC UNIT HAVING INTEGRATED RETAINING SYSTEM

(71) Applicant: DENSO International America, Inc., Southfield, MI (US)

(72) Inventors: Bradley Bielicki, Livonia, MI (US); John Klinkhammer, Livonia, MI (US); Kyle Stabile, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 79 days.

(21) Appl. No.: 18/214,309

(22) Filed: Jun. 26, 2023

(65) Prior Publication Data

US 2023/0331060 A1    Oct. 19, 2023

Related U.S. Application Data

(62) Division of application No. 17/219,385, filed on Mar. 31, 2021, now Pat. No. 11,724,562.

(60) Provisional application No. 63/122,511, filed on Dec. 8, 2020.

(51) Int. Cl.
*B60H 1/00*    (2006.01)

(52) U.S. Cl.
CPC ................ *B60H 1/00535* (2013.01)

(58) Field of Classification Search
CPC ... B60H 1/00535; B60R 13/04; B60R 13/043; F16B 21/07; F16B 12/20
See application file for complete search history.

(56) References Cited

U.S. PATENT DOCUMENTS

| 3,796,124 | A  | * | 3/1974  | Crosa ....................... F16B 5/00 52/489.1 |
| 5,878,594 | A  | * | 3/1999  | Lazzaro .................. F28F 9/002 62/509 |
| 7,207,762 | B2 | * | 4/2007  | Teal ...................... F16B 37/065 411/113 |
| 2010/0236118 | A1 |   | 9/2010  | Meyers et al. |
| 2013/0071205 | A1 | * | 3/2013  | Kuehn .................... F16B 21/20 24/457 |
| 2015/0328951 | A1 | * | 11/2015 | Klinkhammer .... B60H 1/00207 62/239 |

FOREIGN PATENT DOCUMENTS

DE    10011236 A1    9/2001

* cited by examiner

*Primary Examiner* — David J Teitelbaum
(74) *Attorney, Agent, or Firm* — Harness, Dickey & Pierce, P.L.C.

(57) ABSTRACT

A heating, ventilation, and air condition (HVAC) unit includes a casing, a mount, and one or more flexible fingers. The casing is configured to condition air and direct the conditioned air to a vehicle occupant cabin. The mount extends from the casing and is configured to be mounted to an attachment surface. The mount includes an opening that has an inner surface. The flexible fingers each have a proximal end that extends from the inner surface and a distal end. One or more of the distal ends of the flexible fingers are configured to engage an attachment feature extending from the attachment surface and through the opening in the mount to secure the mount to the attachment feature.

7 Claims, 9 Drawing Sheets

VEHICLE HVAC UNIT HAVING INTEGRATED RETAINING SYSTEM

CROSS-REFERENCE TO RELATED APPLICATION

This application is a divisional application of U.S. patent application Ser. No. 17/219,385, filed Mar. 31, 2021, which claims priority to and the benefit of U.S. Provisional Patent Application No. 63/122,511 filed Dec. 8, 2020. The disclosures of the above applications are incorporated herein by reference.

FIELD

The present disclosure relates to a vehicle HVAC unit having an integrated retaining system.

BACKGROUND

The statements in this section merely provide background information related to the present disclosure and may not constitute prior art.

A typical vehicle includes a heating, ventilation, and air conditioning (HVAC) unit that may be coupled to a vehicle dashboard and that provides conditioned air (e.g., heated and/or cooled and/or dehumidified or humidified and/or filtered) to a vehicle occupant cabin via one or more duct lines. During assembly of the HVAC unit to the vehicle dashboard, an operator typically positions the HVAC unit onto studs extending from the vehicle dashboard and then grabs a tool to torque fastening nuts onto the studs, thereby securing the HVAC unit to the vehicle dashboard. The HVAC unit may become disengaged from the studs once the operator takes his or her hands off the HVAC unit to grab a tool, for example. The present disclosure provides an HVAC unit that solves this and other issues associated with typical HVAC units.

SUMMARY

This section provides a general summary of the disclosure and is not a comprehensive disclosure of its full scope or all of its features.

In one form, the present disclosure discloses a heating, ventilation, and air condition (HVAC) unit including a casing, a first mount, and one or more first flexible fingers. The casing is configured to direct conditioned air to a vehicle occupant cabin. The first mount extends from the casing and is configured to be mounted to an attachment surface. The first mount includes a first opening having a first inner surface. The first flexible fingers each has a proximal end extending from the first inner surface and a distal end. One or more of the distal ends of the first flexible fingers are configured to be engaged with a first attachment feature extending from the attachment surface and through the first opening in the first mount to secure the first mount to the first attachment feature.

In some configurations, each first finger is tapered from the proximal end towards the distal end.

In some configurations, the distal ends of the first flexible fingers cooperate to form a circular-shaped opening. The circular-shaped opening is configured to receive the first attachment feature of the attachment surface.

In some configurations, the first inner surface is a circumferentially-shaped inner surface. The first flexible fingers are circumferentially spaced around the circumferentially-shaped inner surface.

In some configurations, the first inner surface is a circumferentially-shaped inner surface. The first flexible fingers extend radially inwardly from the circumferentially-shaped inner surface.

In some configurations, the first flexible fingers have a first thickness and the first mount has a second thickness. The second thickness is equal to or greater than the first thickness.

In some configurations, the HVAC unit further includes a second mount and one or more second flexible fingers. The second mount extends from the casing and is configured to be mounted to the attachment surface. The second mount includes a second opening having a second inner surface. The second flexible fingers each having a proximal end extending from the second inner surface and a distal end. One or more of the distal ends of the second flexible fingers are configured to engage a second attachment feature extending from the attachment surface and through the second opening in the second mount to secure the second mount to the second attachment feature.

In another form, the present disclosure discloses a heating, ventilation, and air condition (HVAC) unit including a casing, a mount and a retaining washer. The casing is configured to direct conditioned air to a vehicle occupant cabin. The mount extends from the casing and is configured to be mounted to an attachment surface. The mount includes a slot and an opening. The retaining washer is moveably disposed within the slot and includes one or more flexible retaining features each having a proximal end and a distal end. One or more of the distal ends of the flexible retaining features are configured to be engaged with an attachment feature extending from the attachment surface and through the opening in the mount to secure the mount to the attachment feature.

In some configurations, the opening includes a first inner circumferential surface having a first diameter and the slot includes a second inner circumferential surface having a second diameter. The second diameter is greater than the first diameter.

In some configurations, the mount includes a first axial end surface and a second axial end surface. The slot is formed in the mount between the first axial end surface and the second axial end surface.

In some configurations, the mount includes a first member and a second member removably coupled to the first member. The first and second members cooperate to form the opening having a circular shape.

In some configurations, the retaining washer includes a body portion having an aperture formed therein. The flexible retaining features extend radially inwardly from an inner circumferential surface of the aperture.

In some configurations, each retaining feature is tapered from the proximal end towards the distal end.

In some configurations, the distal ends of the flexible retaining features cooperate to form a circular-shaped opening. The circular-shaped opening is configured to receive the attachment feature of the attachment surface.

In some configurations, the circular-shaped opening is within the opening in the mount.

In yet another form, the present disclosure discloses a method for coupling a heating, ventilation, and air condition (HVAC) unit to an attachment surface. The method includes providing the attachment surface having at least one attachment feature extending therefrom, aligning an opening formed in a mount of the HVAC unit with the at least one attachment feature of the attachment surface, and inserting the at least one attachment feature through the opening such that one or more flexible fingers associated with the mount engage the at least one attachment feature to secure the mount to the at least one attachment feature.

In some configurations, each flexible finger includes a proximal end and a distal end. Each flexible finger is tapered from the proximal end towards the distal end.

In some configurations, distal ends of the flexible fingers cooperate to form a circular-shaped opening. The circular-shaped opening is within the opening in the mount.

In some configurations, inserting the at least one attachment feature through the opening in the mount includes inserting the at least one attachment feature through the circular-shaped opening formed by the distal ends of the flexible fingers.

In some configurations, the flexible fingers extend from an inner circumferential surface of the opening formed in the mount.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
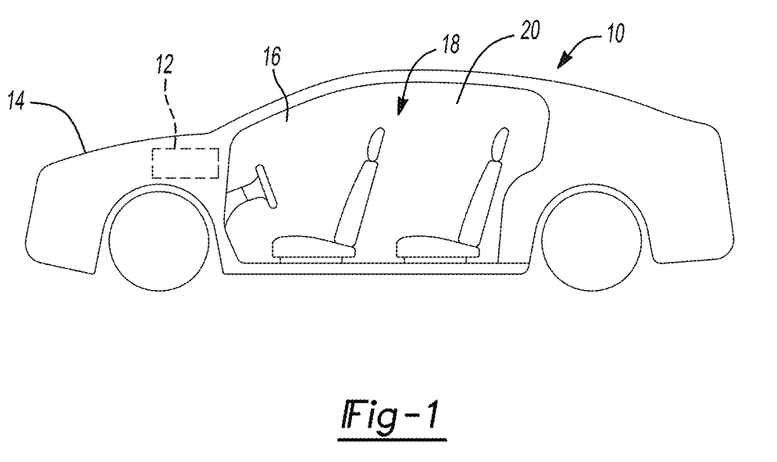
FIG. 1 is a schematic view of a representative vehicle including a heating, ventilation, and air conditioning (HVAC) unit in accordance with the present teachings.

As shown in FIG. 1, a vehicle 10 having a heating, venting, and air cooling (HVAC) unit 12 is provided. The HVAC unit 12 is disposed in a front portion 14 of the vehicle 10. The HVAC unit 12 may provide airflow (e.g., heated and/or cooled) to a front region 16 of a vehicle cabin 18 via a front set of duct lines (not shown) and/or a rear region 20 of the vehicle cabin 18 via a rear set of duct lines (not shown). With reference to FIGS. 2-6, the HVAC unit 12 is coupled to a vehicle dashboard 21 and includes a casing 22 (FIGS. 2 and 4) and a plurality of mounts 24.

Figure 2:
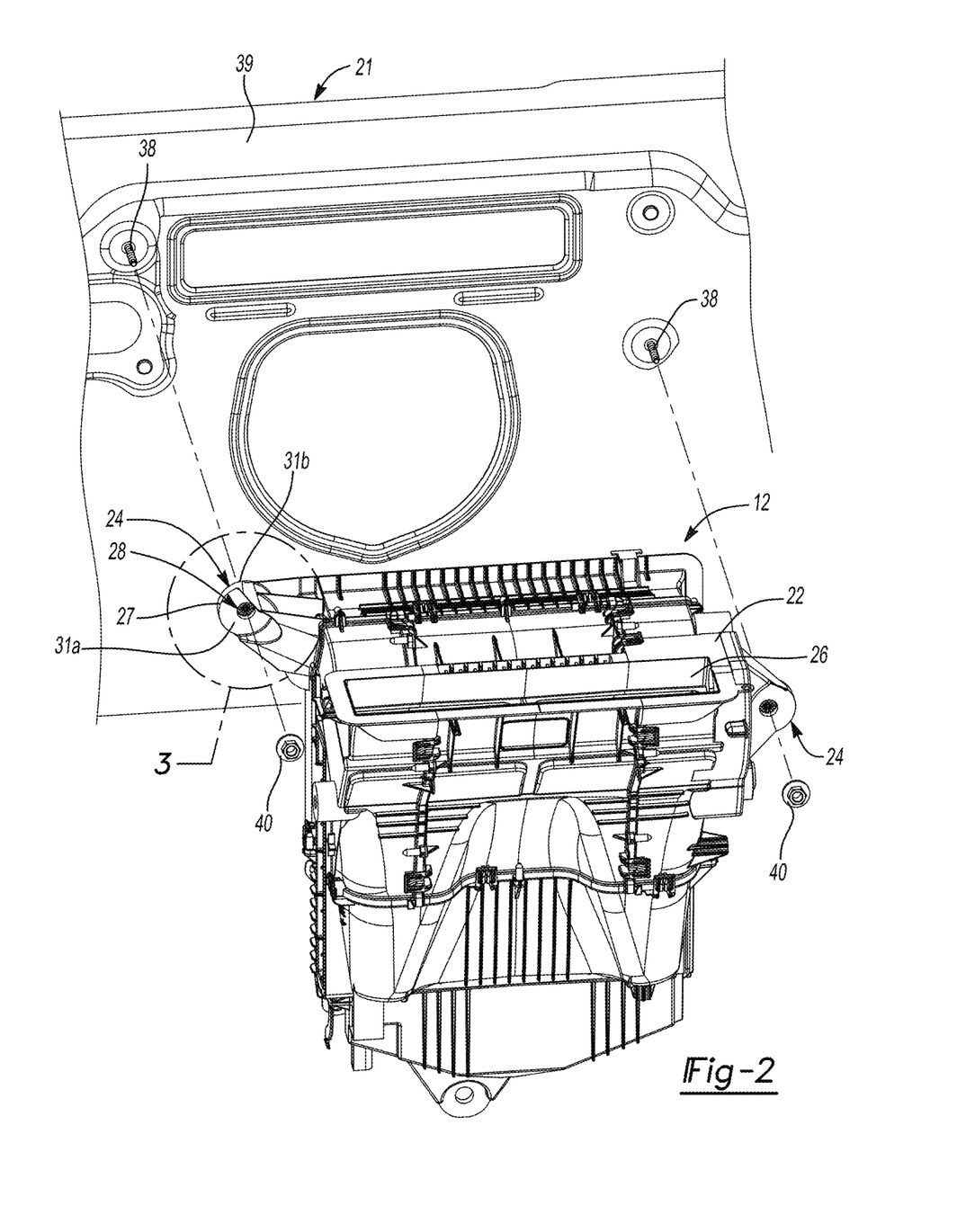
FIG. 2 is a perspective view of the HVAC unit exploded from a vehicle dashboard.
Figure 4:
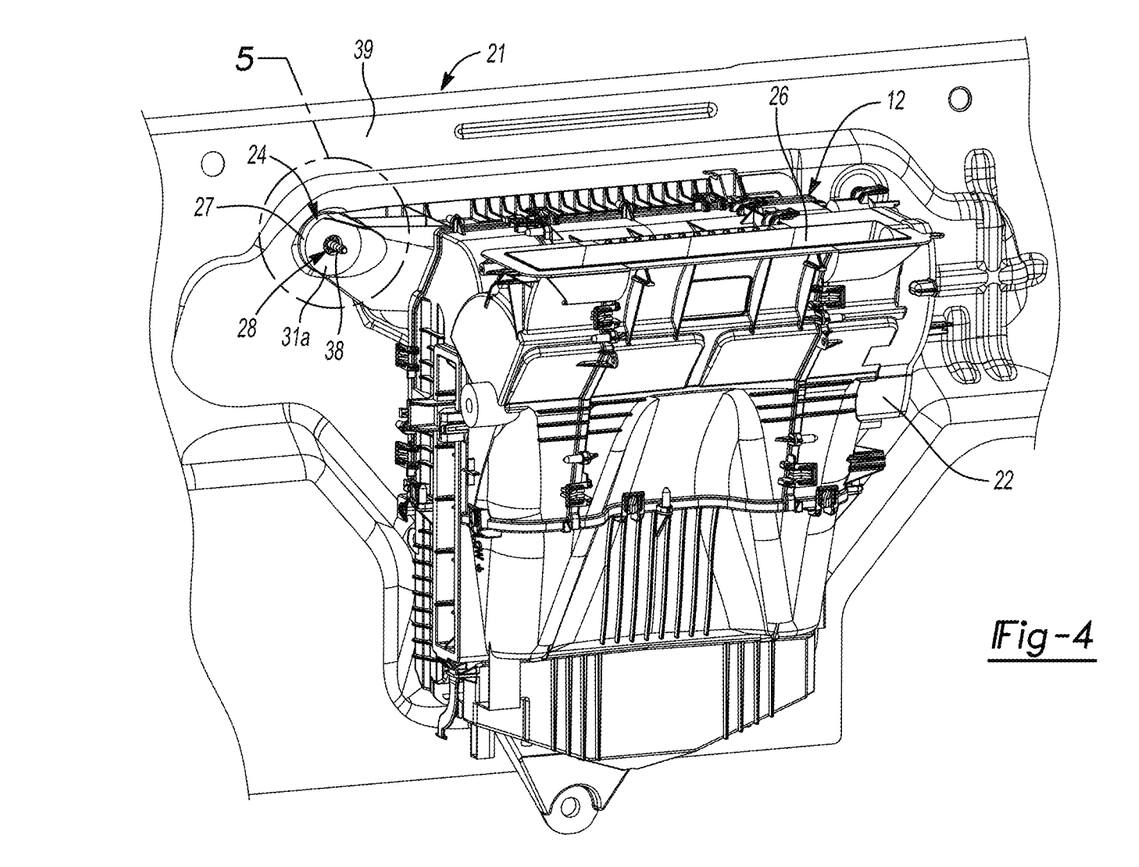
FIG. 4 is a perspective view of the HVAC unit of FIG. 2 assembled to the vehicle dashboard.

The casing 22 may be formed of one or more shells and may include a first inlet opening 26, a second inlet opening (not shown), and one or more outlet opening (not shown). Air conditioning components such as an evaporator (not shown) and a heater core (not shown) may be disposed within the casing 22 to heat and/or cool air flowing therethrough. For example, ambient air may be drawn in through the first inlet opening 26 where it is conditioned (e.g., heated and/or cooled) prior to exiting the outlets into the vehicle cabin 18 via the front set of duct lines and/or the rear set of duct lines. In another example, cabin air may be drawn in through the second inlet opening where it is conditioned prior to exiting the outlets into the vehicle cabin 18 via the front set of duct lines and/or the rear set of duct lines.

Figure 3:
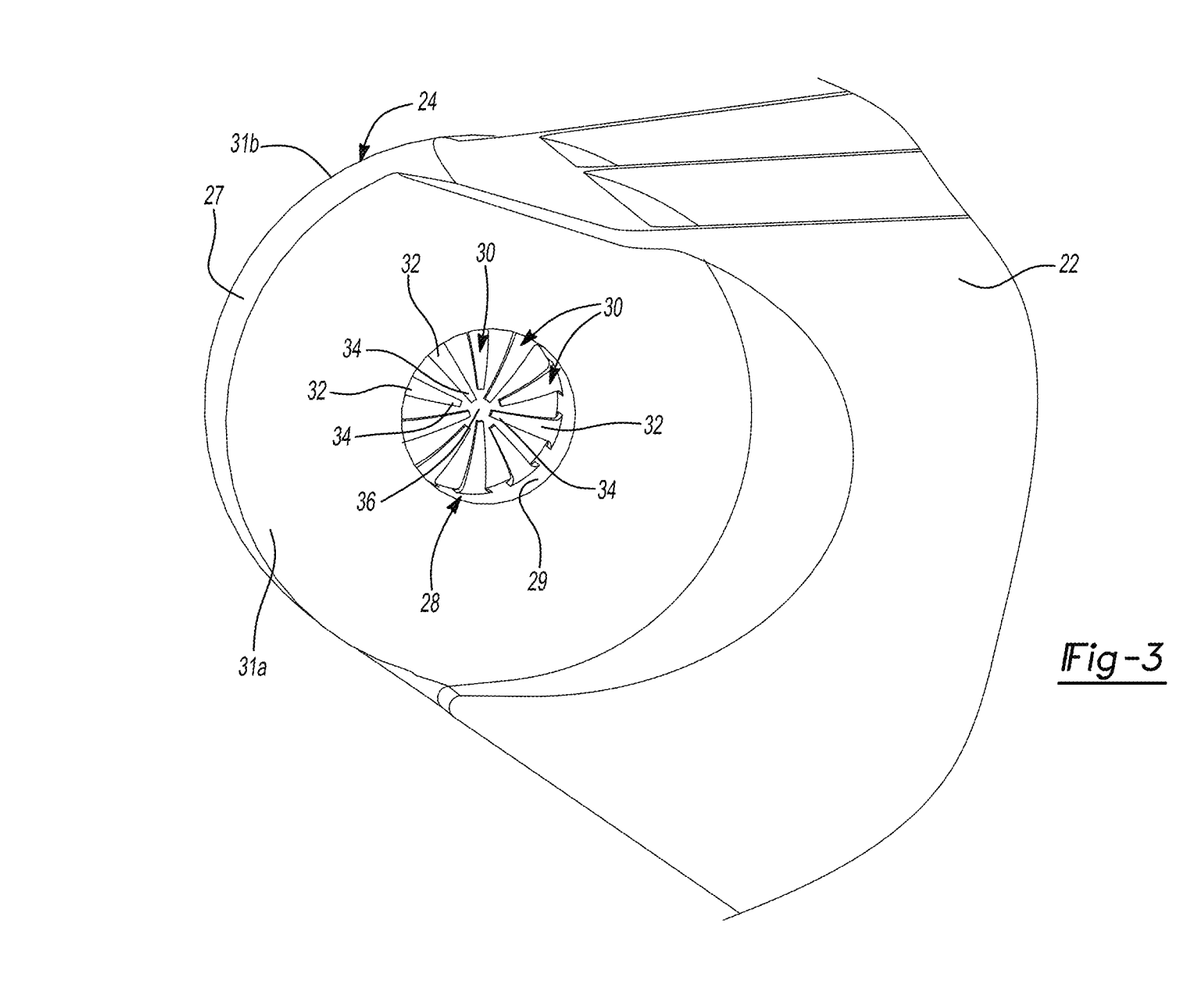
FIG. 3 is a close-up perspective view of the area indicated as area 3 of FIG. 2.
Figure 5:
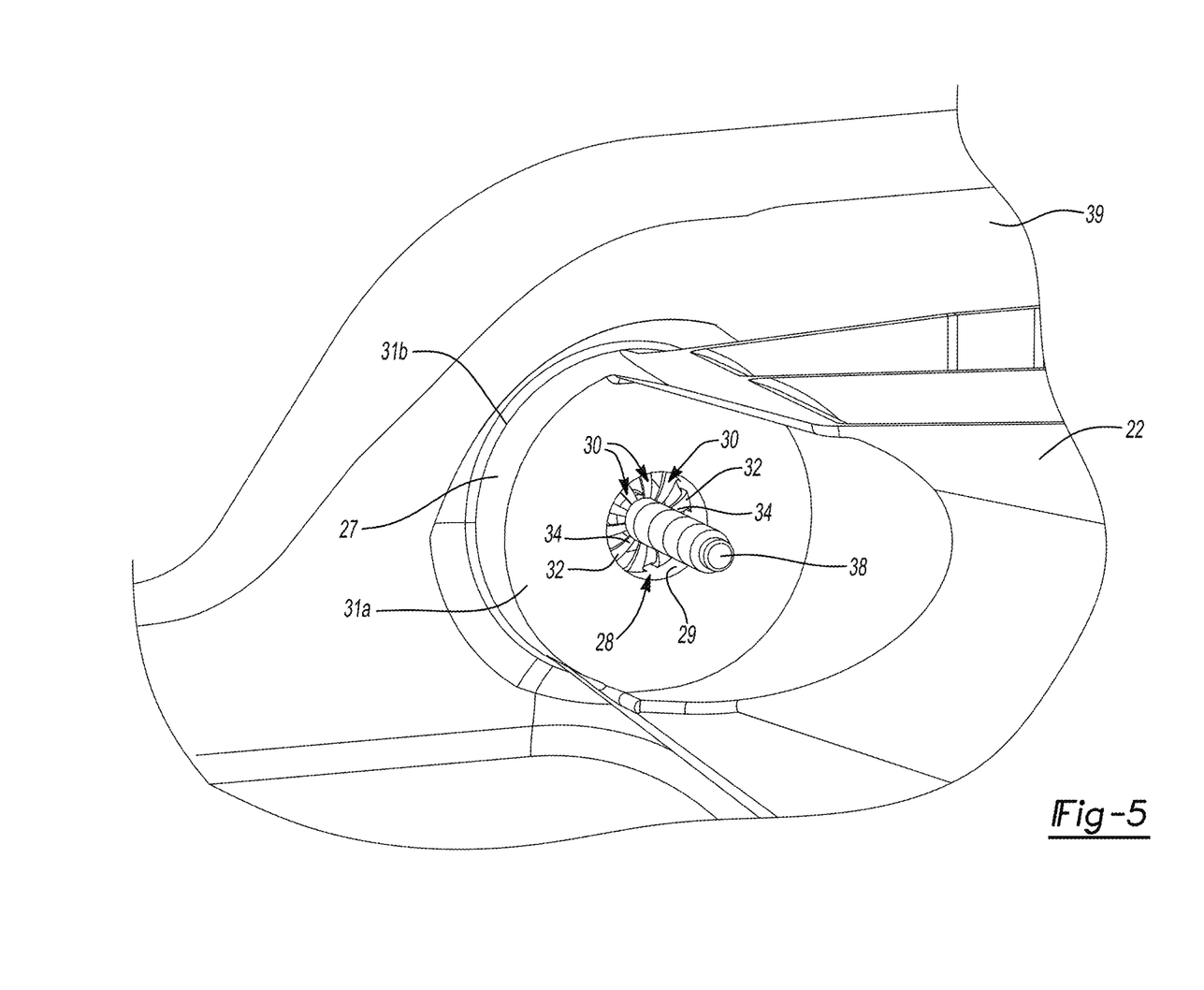
FIG. 5 is a close-up perspective view of the area indicated as area 5 of FIG. 4.

As shown in FIGS. 2-6, each mount 24 extends from the casing 22 and is configured to be coupled to the vehicle dashboard 21. Each mount 24 has a generally circular shape and includes an outer circumferential surface 27 and a circular-shaped opening 28 having an inner circumferential surface 29 (FIGS. 3 and 5). In some configurations, the opening 28 may be triangular, rectangular, or any other suitable shape.

A plurality of flexible fingers or retaining features 30 are circumferentially spaced apart around the inner circumferential surface 29 of a respective mount 24 and extend radially inwardly from the inner circumferential surface 29 of the respective mount 24 (the flexible fingers 30 are cantilevered to the mount 24). The flexible fingers 30 are also positioned between first and second end surfaces 31a, 31b of the mount 24. The flexible fingers 30 may be made of a polymeric material, for example, or any other suitable material that is allowed to bend or flex. The mount 24 has a thickness (i.e., the distance between the first and second end surfaces 31a, 31b) that is equal to or greater than a thickness of the flexible fingers 30. The flexible fingers 30 and the mount 24 are manufactured as a single piece (manufactured from a single molded part).

As shown best in FIGS. 3 and 5, each flexible finger 30 has a proximal end 32 (i.e., proximal to the inner circumferential surface 29) and a distal end 34 (i.e., distal to the inner circumferential surface 20). Each flexible finger 30 is tapered from the proximal end 32 towards the distal end 34. In this way, a width of the proximal end 32 is greater than a width of the distal end 34. The distal ends 34 of the flexible fingers 30 may cooperate to form a generally circular-shaped opening 36 (FIG. 3) having a diameter that is less than a diameter of the circular-shaped opening 28. The opening 36 is positioned within the opening 28 of the mount 24 and is configured to receive a respective threaded attachment feature or stud 38 extending from an attachment surface 39 of the vehicle dashboard 21. It is understood that the length of some of the flexible fingers 30 shown may be longer than other flexible fingers 30. However, in some configurations (not shown), they can all be the same length or have different configurations of lengths than shown.

With continued reference to FIGS. 1-6, assembly (i.e., a method of assembling) of the HVAC unit 12 to the vehicle dashboard 21 will now be described in detail. First, the vehicle dashboard 21 is provided. The threaded studs 38 extend from the attachment surface 39 of the vehicle dashboard 21.

Next, as shown in FIG. 2, an operator (not shown) aligns the opening 28 of each mount 24 of the HVAC unit 12 with a respective stud 38 of the vehicle dashboard 21. Next, as shown in FIGS. 4 and 5, the operator (not shown) positions each mount 24 onto the respective stud 38 (the stud 38 extends through the opening 36 formed by the flexible fingers 30) such that one or more flexible fingers 30 extending from the inner circumferential surface 29 of the mount 24 engage the respective stud 38 to inhibit the mount 24 from disengaging from the respective stud 38 (secure the mount 24 onto the respective stud 38). Stated differently, the distal end 34 of one or more flexible fingers 30 engages threads of the stud 38, thereby inhibiting the mount 24 from disengaging from the stud 38 once the operator (not shown) takes his or her hands off of the HVAC unit 12 to grab a tool (not shown), for example. It should be understood that one or more of the flexible fingers 30 are allowed to bend or flex to accommodate tolerances between the stud 38 and the opening 36 while also engaging the stud 38 to inhibit the mount 24 from disengaging from the stud 38.

Figure 6:
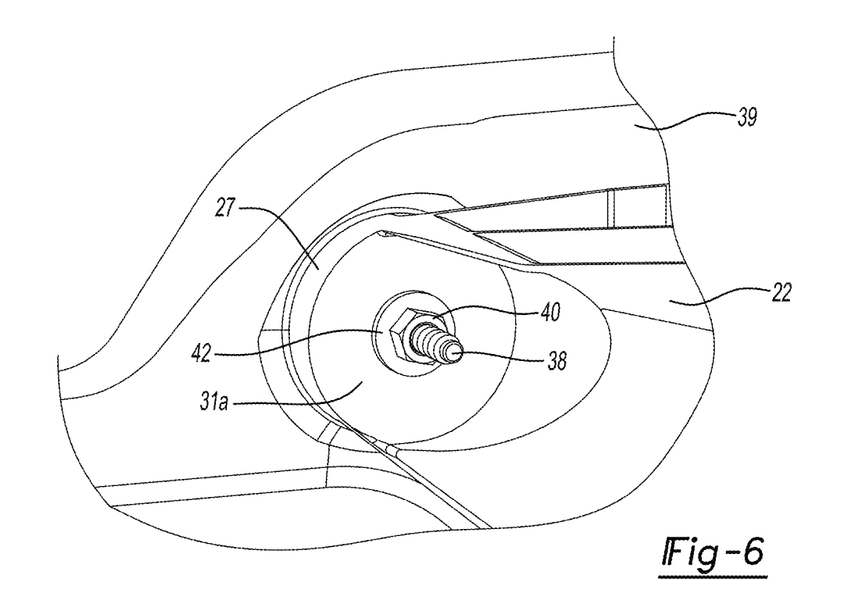
FIG. 6 is a close-up perspective view similar to FIG. 5, illustrating a mount of the HVAC unit positioned onto a stud of the vehicle dashboard with a nut threadably engaged to the stud.
Figure 7:
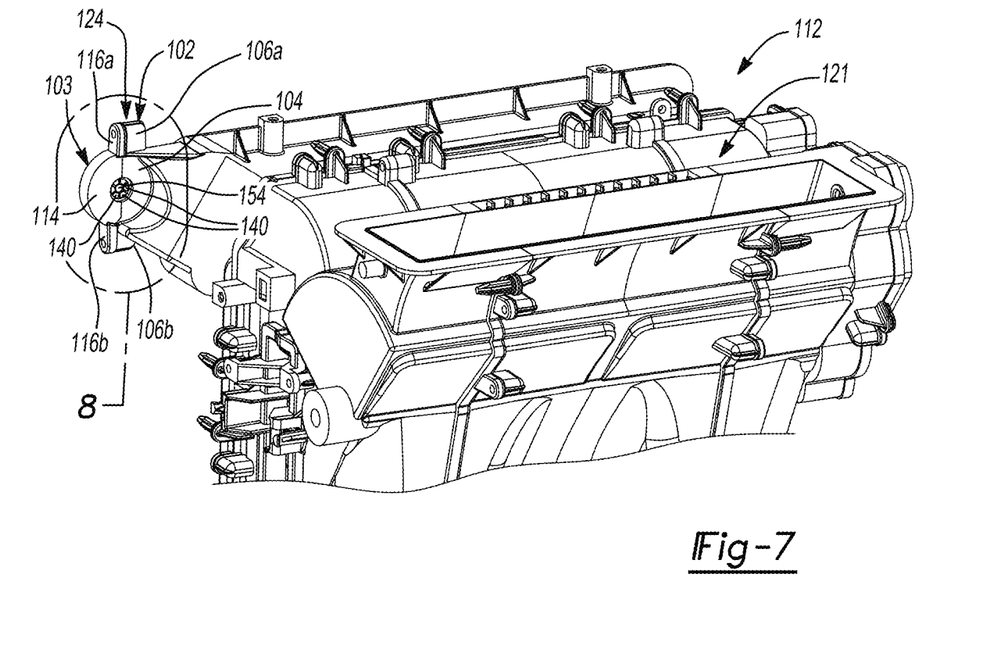
FIG. 7 is a perspective view of a portion of an alternate HVAC unit in accordance with the teachings of the present disclosure.

Finally, as shown in FIG. 6, the operator (not shown) torques a nut 40 onto each stud 38 using the tool, thereby applying clamping force to the first end surface 31a, further securing the HVAC unit 12 to the vehicle dashboard 21. In the example provided, an optional washer 42 can be disposed between the nut 40 and the first end surface 31a.

The flexible fingers 30 of the present disclosure provide the benefit of securing the mounts 24 to the studs 38 when the operator takes his or her hands off of the HVAC unit 12 after the mounts 24 are initially positioned onto the studs 38 and before the operator torques the nut 40 onto each stud 38.

With reference to FIGS. 7-10, another HVAC unit 112 is provided. The HVAC unit 112 may be incorporated into the vehicle 10 described above instead of HVAC unit 12. The structure and function of the HVAC unit 112 may be similar or identical to that of HVAC unit 12 described above, apart from any exceptions noted below.

The HVAC unit 112 may be coupled to the vehicle dashboard 21 and includes a casing 121 (FIG. 7) and a plurality of mounts 124 (only one shown in the figures). The structure and function of casing 121 may be similar or identical to casing 22 described above, and therefore, will not be described again in detail.

Each mount 124 is coupled to the vehicle dashboard 21 (FIG. 2). As shown in FIGS. 7-10, each mount 124 includes a first connecting member 102 and a second connecting member 103. The first connecting member 102 extends from the casing 121 and includes a body portion 104 and a pair of flange portions 106a, 106b. The body portion 104 has a semi-circular shape and includes a semi-circular opening 115 and a semi-circular slot 117 (FIGS. 9 and 10). The opening 115 is formed along an edge 107 of the body portion 104 at a center thereof. The slot 117 is formed in the body portion 104 between a first end surface 108 and a second end surface 110 of the body portion 104 (FIG. 9). Each flange portion 106a, 106b extends radially outwardly from a periphery of the body portion 104.

With reference to FIG. 7-10, the second connecting member 103 is removably coupled to the first connecting member 102 and includes a body portion 114 and a pair of flange portions 116a, 116b. The body portion 114 has a semi-circular shape and includes a semi-circular opening 113 and a semi-circular slot 118 (FIGS. 9 and 10). The opening 113 is formed along a flat edge 120 of the body portion 114 at a center thereof. The slot 118 is formed in the body portion 114 between a first end surface 122 and a second end surface (not shown) of the body portion 114. Each flange portion 116a, 116b extends radially outwardly from a periphery of the body portion 114 and includes an opening 128 that is aligned with a respective opening 130 of the flange portions 106a, 106b.

A first fastener (not shown, e.g., a screw or bolt) may extend through the opening 128 of the flange portion 116a and the opening 130 of the flange portion 106a and a second fastener (not shown, e.g., a screw or bolt) may extend through the opening 128 of the flange portion 116b and the opening 130 of the flange portion 106b. In this way, the first and second connecting members 102, 103 are connected to each other. When the first and second connecting members 102, 103 are connected to each other, the opening 115 of the first connecting member 102 and the opening 113 of the second connecting member 103 cooperate to form a circular-shaped opening 132 (FIG. 8), and the slot 117 of the first connecting member 102 and the slot 118 of the second connecting member 103 cooperate to form a circular-shaped slot 134 (FIG. 10). A diameter of the circular-shaped slot 134 is greater than a diameter of the circular-shaped opening 132.

A separate retaining washer 136 is movably disposed within the slot 134 formed by the first and second connecting members 102, 103 (FIG. 10). That is, while the second connecting member 103 is decoupled from the first connecting member 102, the retaining washer 136 is disposed in one of the slots 117, 118 of the first and second connecting members 102, 103 prior to coupling the second connecting member 103 to the first connecting member 102.

Figure 8:
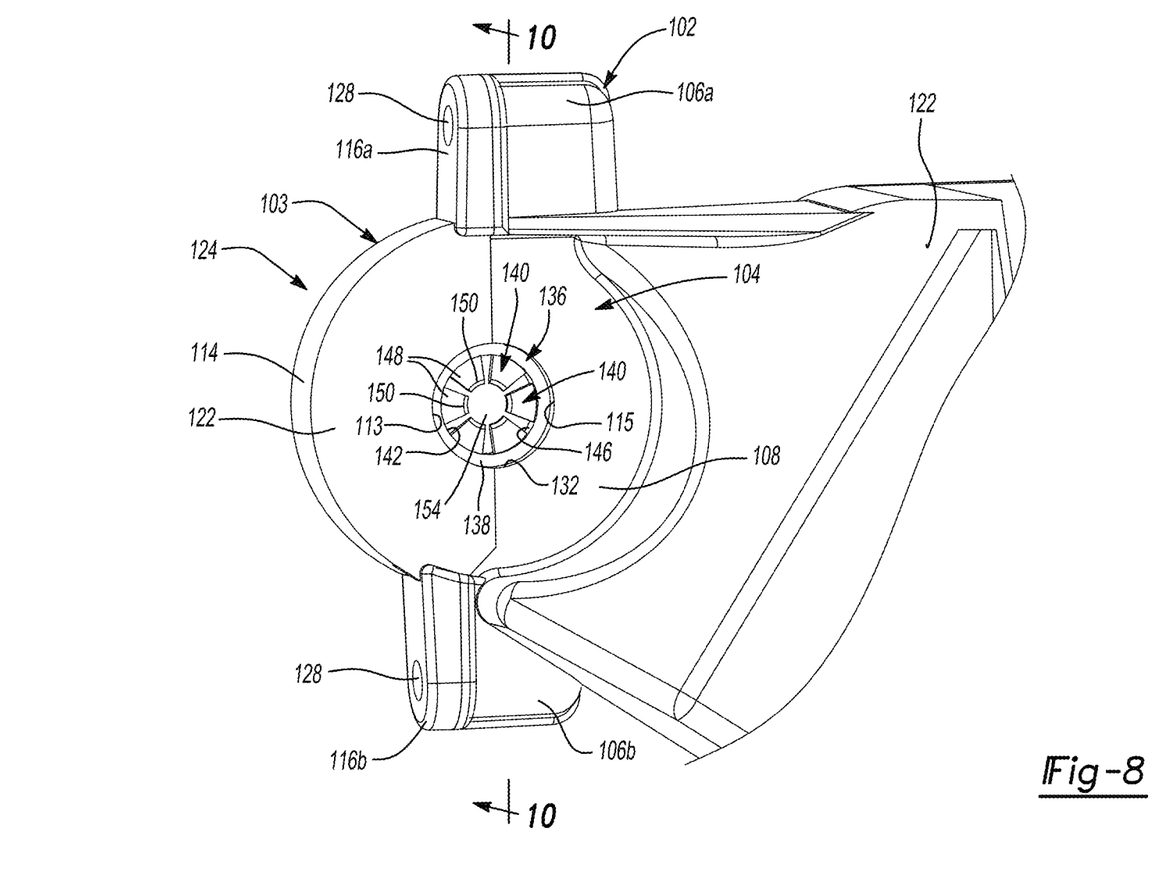
FIG. 8 is a close-up perspective view of the area indicated as area 8 of FIG. 7.
Figure 9:
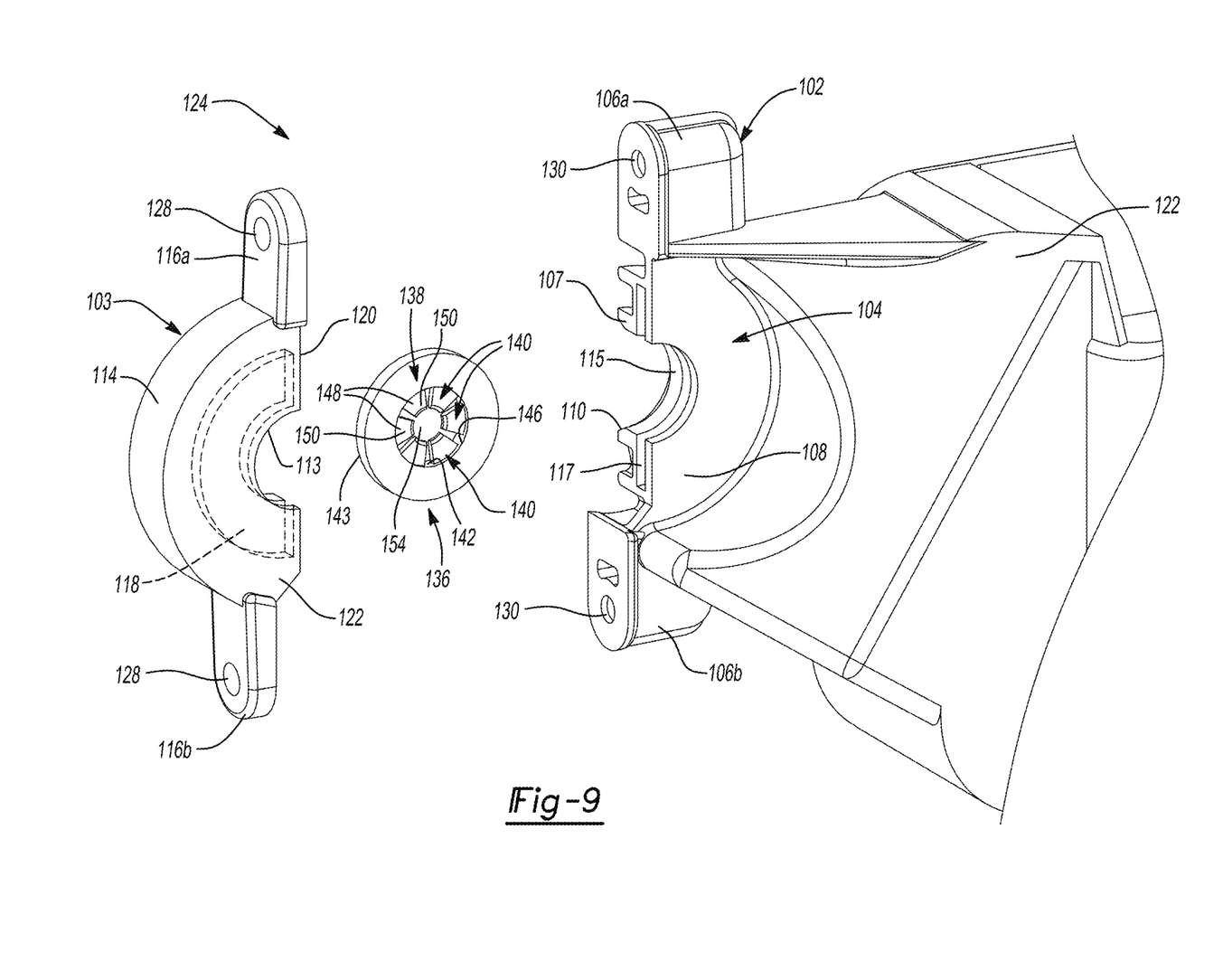
FIG. 9 is a close-up perspective view of a mount of the HVAC unit of FIG. 7 with a first member of the mount and a second member of the mount exploded from each other.
Figure 10:
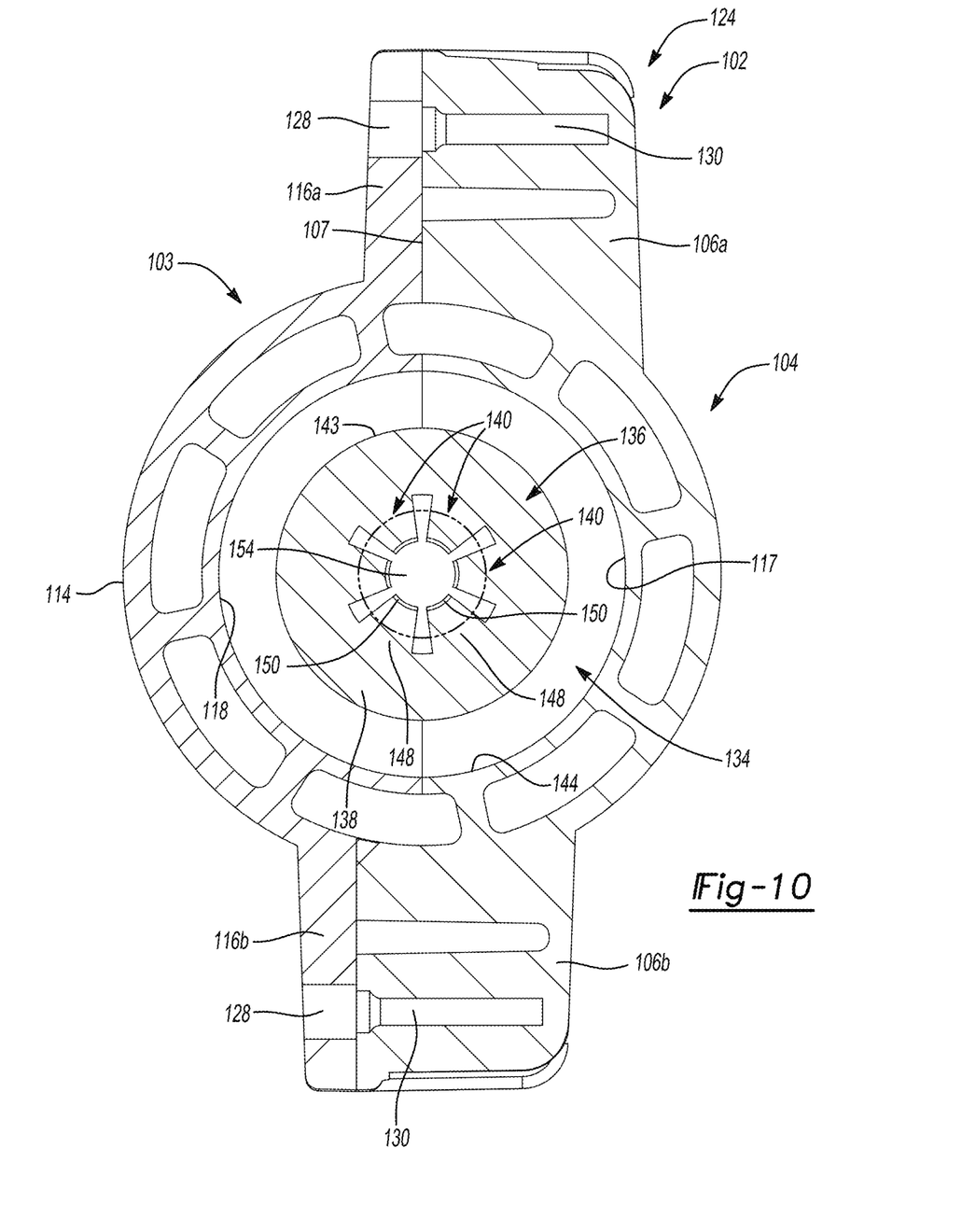
FIG. 10 is a cross-sectional view taken along line 10-10 of FIG. 8.

As shown best in FIGS. 8-10, the retaining washer 136 includes a body portion 138 and a plurality of flexible fingers or retaining features 140. The body portion 138 is circular-shaped and can include a circular-shaped aperture 142 formed therein. The body portion 138 also has an outer circumferential surface 143 that may optionally engage a portion of an inner circumferential surface 144 (FIG. 10) of the slot 134. In the example provided, diameter of the inner circumferential surface 144 is greater than a diameter of the outer circumferential surface 143 such that the retaining washer 136 may move within the slot 134, though other configurations can be used such as having similar diameters. In some configurations, not specifically shown, the outer circumferential surface 143 may be hexagonal, octagonal or any other suitable shape instead of circumferential. In some configurations, not specifically shown, the slot 134 may be hexagonal, octagonal, or any other suitable shape instead of circular.

The flexible fingers 140 are circumferentially spaced apart around an inner circumferential surface 146 of the aperture 142 and extend radially inwardly from the inner circumferential surface 146 of the aperture 142 (the flexible fingers 140 are cantilevered to the body portion 138 of the retaining washer 136). The flexible fingers 140 may be made of a polymeric material, for example, or any other suitable material that is allowed to bend or flex. The mount 124 has a thickness that is equal to or greater than a thickness of the flexible fingers 140.

Each flexible finger 140 has a proximal end 148 (i.e., proximal the inner circumferential surface 146) and a distal end 150 (i.e., distal to the inner circumferential surface 146). Each flexible finger 140 is tapered from the proximal end 148 towards the distal end 150. In this way, a width of the proximal end 148 is greater than a width of the distal end 150. The distal ends 150 of the flexible fingers 140 may cooperate to form a generally circular-shaped opening 154 having a diameter that is less than a diameter of the circular-shaped opening 132 formed by the first and second connecting members 102, 103. The opening 154 is positioned within the opening 132 and is configured to receive a respective threaded stud 38 extending from the vehicle dashboard 21. Stated differently, the opening 154 formed by the flexible fingers 140 is always accessible from the opening 132 regardless of the movement of the retaining washer 136 within the slot 134 formed by the first and second connecting members 102, 103 (the retaining washer 136 is allowed to move within the slot 134 to accommodate tolerances between the stud 38 and the opening 154). It should be understood that one or more of the flexible fingers 140 are allowed to bend or flex to accommodate tolerances between the stud 38 and the opening 154 while also engaging the stud 38 to secure the mount 124 to the stud 38. In the example provided, the length of each flexible finger 140 shown in the figures are equal to each other. However, in some configurations, the lengths of the flexible fingers 140 may be different and may be similarly arranged as the flexible fingers 30 (FIG. 3).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heating, ventilation, and air condition (HVAC) unit comprising:
   a casing configured to direct conditioned air to a vehicle occupant cabin;
   a mount extending from the casing and configured to be mounted to an attachment surface, the mount including a slot and an opening; and
   a retaining washer moveably disposed within the slot and including one or more flexible retaining features each having a proximal end and a distal end,
   wherein one or more of the distal ends of the one or more flexible retaining features are configured to be engaged with an attachment feature extending from the attachment surface and through the opening in the mount to secure the mount to the attachment feature, and
   wherein the mount includes a first member and a second member removably coupled to the first member, and wherein the first and second members cooperate to form the opening having a circular shape.

2. The HVAC unit according to claim 1, wherein the opening includes a first inner circumferential surface having a first diameter and the slot includes a second inner circumferential surface having a second diameter, and wherein the second diameter is greater than the first diameter.

3. The HVAC unit according to claim 1, wherein the mount includes a first axial end surface and a second axial end surface, and wherein the slot is formed in the mount between the first axial end surface and the second axial end surface.

4. The HVAC unit according to claim 1, wherein the retaining washer includes a body portion having an aperture formed therein, and wherein the one or more flexible retaining features extend radially inwardly from an inner circumferential surface of the aperture.

5. The HVAC unit according to claim 1, wherein each retaining feature is tapered from the proximal end towards the distal end.

6. The HVAC unit according to claim 1, wherein the distal ends of the one or more flexible retaining features cooperate to form a circular-shaped opening, and wherein the circular-shaped opening is configured to receive the attachment feature of the attachment surface.

7. The HVAC unit according to claim 6, wherein the circular-shaped opening is within the opening in the mount.

* * * * *